Nov. 7, 1972 J. MAKSIM, JR 3,702,297
OIL SKIMMING DEVICE AND METHOD
Filed Feb. 16, 1970 3 Sheets-Sheet 1
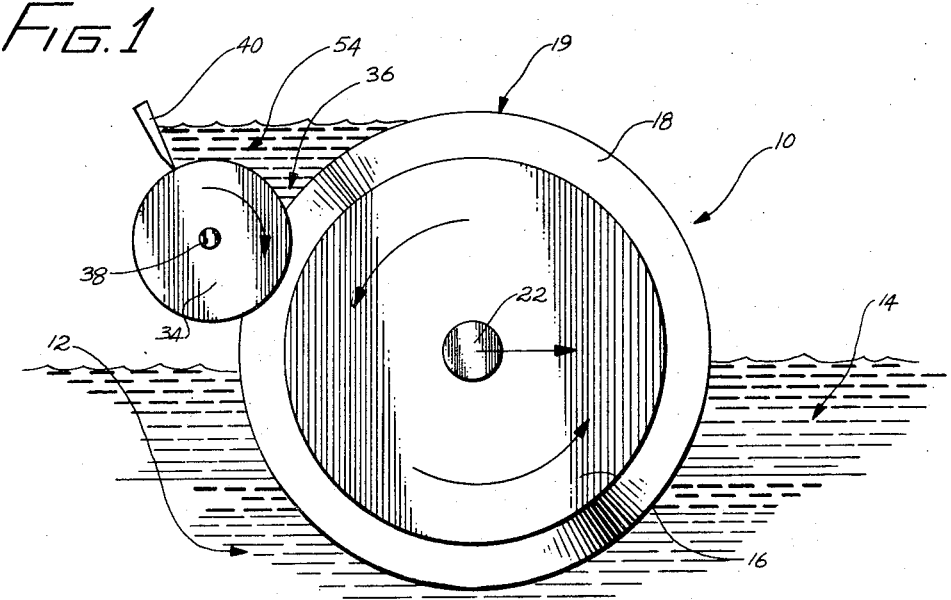
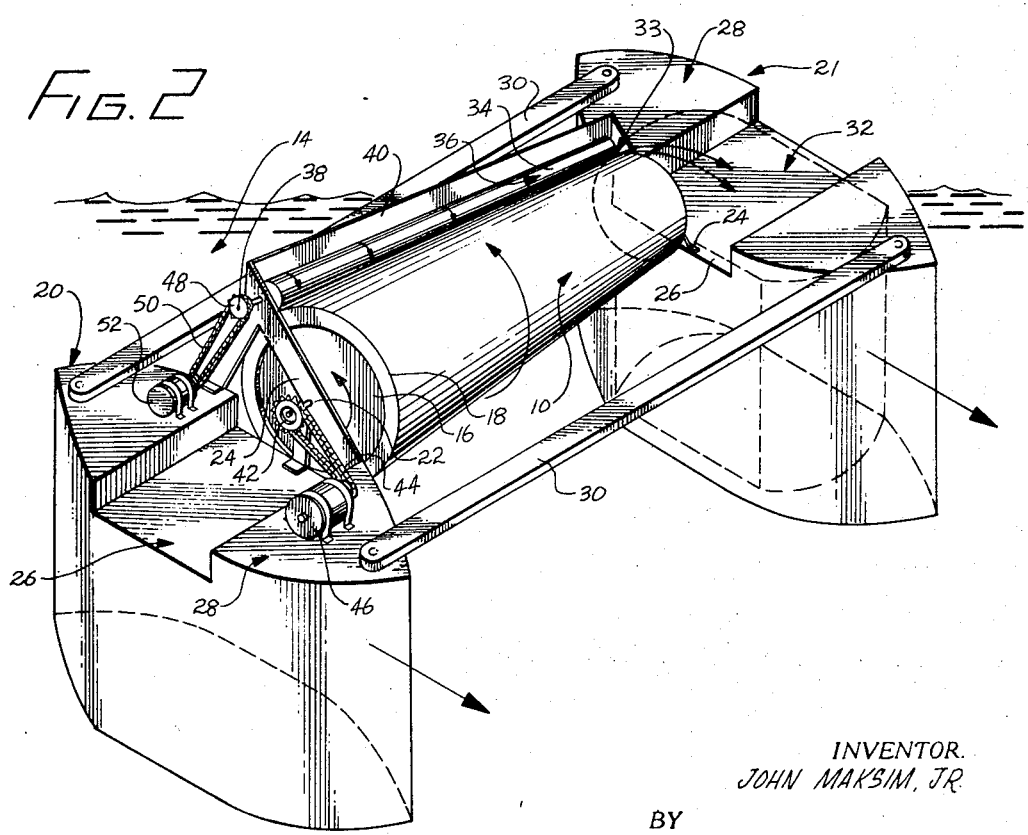
INVENTOR.
JOHN MAKSIM, JR.
BY
Christie, Parker + Hale
ATTORNEYS

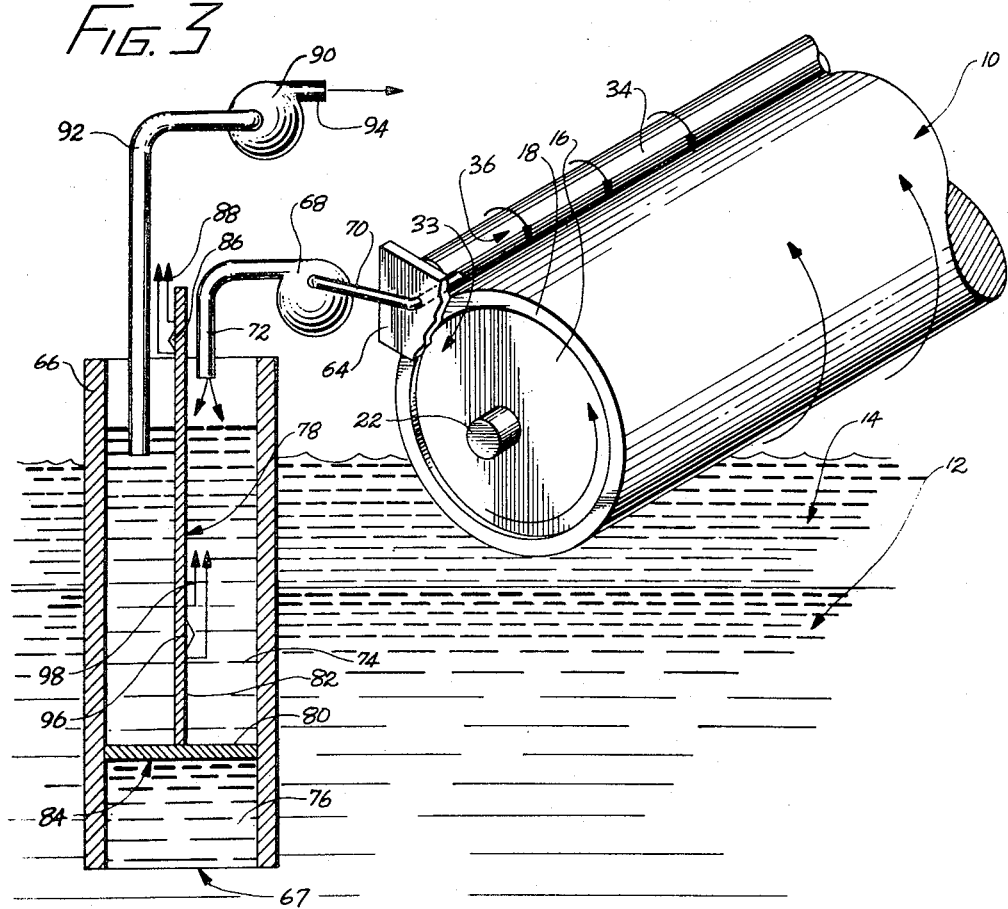
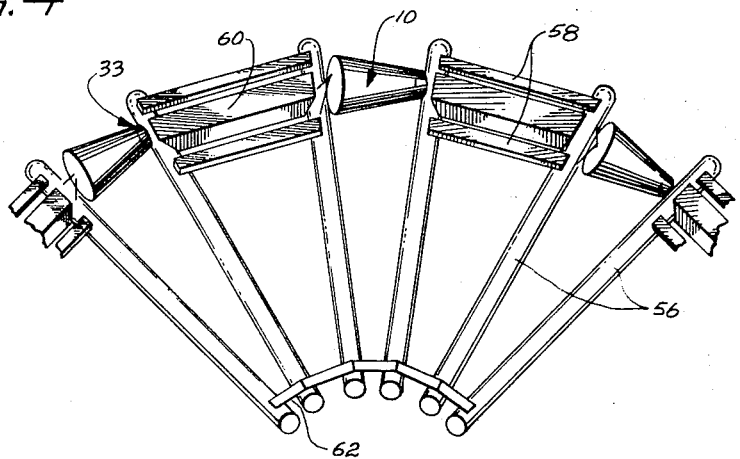

United States Patent Office 3,702,297
Patented Nov. 7, 1972

3,702,297
OIL SKIMMING DEVICE AND METHOD
John Maksim, Jr., 8165 Cornwall Ave.,
Etiwanda, Calif. 91739
Continuation-in-part of application Ser. No. 838,600,
July 2, 1969. This application Feb. 16, 1970,
Ser. No. 11,401
Int. Cl. B01d 15/00
U.S. Cl. 210—40                                    11 Claims

ABSTRACT OF THE DISCLOSURE

A method and apparatus for removing crude oil from a body of water includes a sponge-coated collection roll. The ends of the collection roll are supported from floats so that the lower portion of the roll is immersed in the oil, and a drive mechanism rotates the collection roll to continuously absorb the oil. A downwardly sloping wringer is held tigthly against the lateral surface of the collection roll to deform the collection roll surface and squeeze the oil from the roll. A doctor blade or a roller disposed against the longitudinal surface of the wringer provides an inclined weir for the oil squeezed from the collection roll. The oil flows doviinwardly into a collection tank located adjacent to the collection roll. An elongated baffle plate below the collection roll limits the amount of water taken up by the collection roll. A worm gear removes grease accumulations trapped by the doctor blade or roller.

CROSS-REFERENCE TO RELATED APPLICATION

This is a continuation-in-part of my application Ser. No. 838,600, filed July 2, 1969, now abandoned.

BACKGROUND OF THE INVENTION

Field of the invention

This invention relates to apparatus for recovering crude oil floating on a body of water. More particularly, the invention relates to an oil skimming device and method for absorbing oil from the surface of water and discharging the oil into a collection device.

Description of the prior art

Oil spills from tankers and barges occasionally occur and usually require relatively expensive clean up operations. Oil spills sometimes result from underwater oil drilling accidents, such as blow-outs or fissures created in well formations. If the oil spill is close to shore, it is particularly disastrous because of the potential fire hazard and the damage caused to beaches, boats, marine plant and animal life, and birds. A typical example of such damage is that caused by the leaking of approximately two hundred and fifty thousand gallons of oil from a well six miles offshore from Santa Barbara, Calif., in January 1969. The oil spread over 800 square miles of ocean before it was sealed off, and damage was estimated at several million dollars. In the past, oil slick removal has generally been accomplished by applying an emulsifying agent, such as a detergent, to the oil layer. This has not been a satisfactory solution to the problem, however, because the emulsified oil layer remains harmful to plant and animal life and is still a potential fire hazard. Dispersing agents have also been used for oil slick removal, but they merely spread the layer of oil over a wider area.

SUMMARY OF THE INVENTION

This invention provides an oil skimming device and method for removing crude oil from the surface of water and delivering the oil to a storage device. As a result, the oil is eliminated from the surface of the water, and clean up costs and damages are offset by the value of the oil recovered.

Briefly, the oil skimmer includes an elongated collection roll preferably having a deformable surface capable of absorbing oil. The collection roll is mounted on a supporting structure which continuously holds the absorbent outer surface of the roll in contact with the oil. In the preferred form of the invention, the collection roll is tapered toward one end and is supported so that its upper surface is inclined relative to the top of the oil layer. A discharge roll or wringer is tightly disposed against the lateral surface of the collection roll, and is preferably inclined toward the tapered end of the roll to provide an elongated, downward sloping channel. A drive mechanism rotates the collection roll so that the roll absorbs oil as it rotates. The wringer deforms the rotating surface of the collection roll and squeezes out the oil which has been absorbed. The removed oil is then delivered to a collection device. Preferably, an elongated doctor blade is disposed adjacent to the lateral surface of the wringer to provide a transverse weir for the oil squeezed from the collection roll.

A preferred form of the oil skimming device has baffle means closely spaced from the lower surface of the collection roll for limiting the amount of contact between the surface of the collection roll and the water. Heavy oil and grease within the oil layer are smeared onto the surface of the collection roll by the baffle means. Means such as a roller or a scraper blade held in contact with the discharge roll traps the grease picked up by the collection roll, and a screw conveyor or the like removes the grease.

In a preferred form of the oil skimming device, an open-bottomed receptacle is located in the body of water. The oil squeezed from the collection roll and delivered to the receptacle continuously displaces the water in the bottom of the receptacle. A float disposed in the receptacle actuates a pump for removing the oil when the oil in the receptacle reaches a predetermined volume. Preferably, each end of the collection roll is mounted to a float such as a pontoon or a floating log. As a result, the collection roll floats up and down with the tide so that a relatively constant portion of the roll is continuously immersed in the oil layer. One or more collection rolls can also be mounted at the front of a floating barge, for example, so that the roll can be driven relative to the oil layer.

BRIEF DESCRIPTION OF THE DRAWINGS

The features of specific embodiments of the best mode contemplated of carrying out the invention are illustrated in the drawings, in which:

FIG. 1 is a schematic side elevation showing the operation of the oil skimming device;

FIG. 2 is a perspective view of the oil skimmer mounted on a floating support structure;

FIG. 3 is a perspective view showing a system of oil recovery in combination with the oil skimmer;

FIG. 4 is a schematic plan elevation showing means for recovering oil removed from the collection roll;

DETAILED DESCRIPTION OF A SPECIFIC EMBODIMENT

Figure 5:
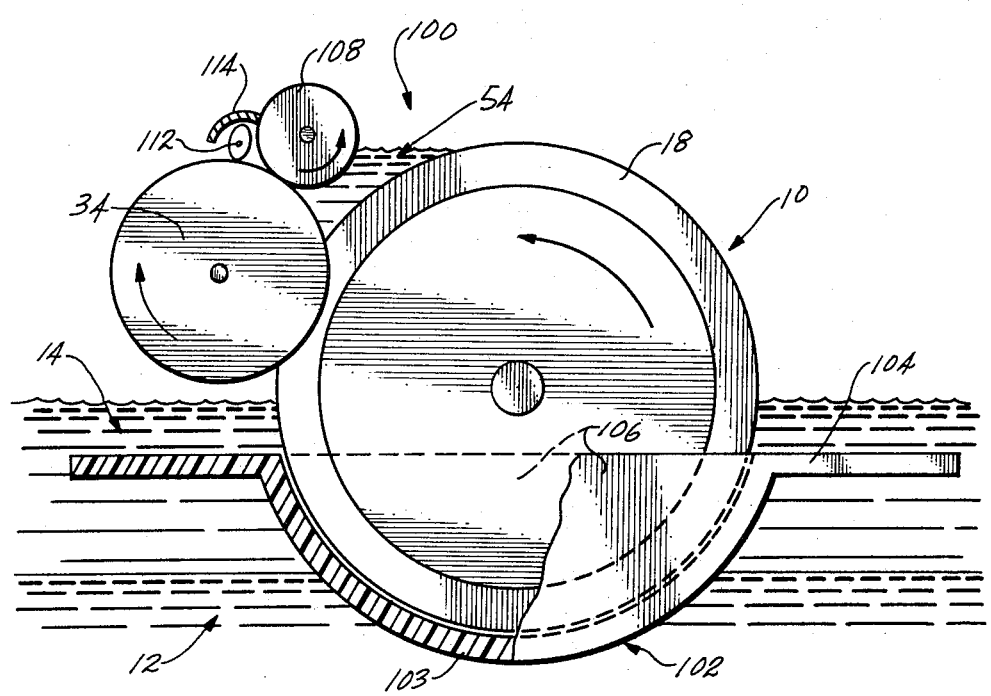
FIG. 5 is a schematic fragmentary side elevation, partly in section, showing the oil skimmer in combination with the baffle plate and screw conveyor means.

Referring to the drawings, an oil skimming device 8 of this invention includes an elongated, tapered oil collection roll 10 rotatably mounted transversely to a body of water 12 having a top layer of crude oil 14. The collection roll has a core 16 preferably in the form of a truncated cone with an absorbent outer covering 18 of a material having an affinity for oil. Preferably, the core is constructed of a high-strength, oil-resistant, relatively inexpensive material such as wood, or rubber. The outer covering of the collection roll preferably comprises any of a variety of oil-wet foam sponge materials. Such materials are well known.

As seen best in FIG. 2, a pair of floating pontoons 20 and 21 support the ends of collection roll 10 above oil layer 14. The collection roll rotates about an elongated, centrally-disposed shaft 22, and each end of the shaft is secured to an upwardly extending framework 24 mounted on a recessed deck surface 26 of each pontoon. A hollow chamber (not shown) is located in the lower interior portion of each pontoon. The chambers are flooded to reduce the buoyancy of the pontoons so that the lower portion of the collection roll is immersed in the oil layer, as shown in FIG. 1. The chambers are also flooded so that their upper deck surfaces 28 are located slightly above the upper level of oil layer 14. To transport the pontoons, water can be withdrawn from the chambers to increase the buoyancy of the pontoons. A pair of relatively flat, elongated cross-ties 30 are secured to the front and rear of the pontoons to maintain the alignment of upper decks 28 as the pontoons float up and down with the tide. Preferably, the bottom longitudinal surface of the collection roll is disposed substantially parallel to the upper level of the oil layer so that a relatively constant portion of sponge coating 18 is immersed in the oil. An extreme upper longitudinal surface 19 of the collection roll is inclined downwardly toward pontoon 21. A hollow interior collection chamber 32 is located centrally of pontoon 21 directly adjacent to a lower discharge end 33 of the collection roll.

An elongated cylindrical discharge roll or wringer 34 is disposed tightly against the outer surface of collection roll 10 above the top of oil layer 14 and below upper longitudinal surface 19 of the collection roll. The longitudinally extending wringer and collection roll define a downward sloping collection channel 36 extending toward collection chamber 32 of pontoon 21. The wringer rotates about a centrally disposed shaft 38 supported by framework 24 at its ends. An elongated doctor blade 40 is disposed adjacent to the longitudinal surface of the wringer and is secured at its ends to part of framework 24. A sprocket wheel 42 secured to the end of collection roll shaft 22 is driven by a sprocket chain 44 connected to a drive motor 46 mounted on upper surface 28 of pontoon 20. A second sprocket wheel 48 secured to the end of wringer shaft 38 is driven by a second sprocket chain 50 connected to a second drive motor 52 mounted on upper deck surface 28.

In use, motor 46 drives collection roll 10 in a counterclockwise direction toward collection channel 36 as shown by the arrows in FIGS. 1 and 2. As the collection roll is rotated through the oil layer, sponge coating 18 continuously absorbs oil and water and carries the oil/water mixture upwardly toward wringer 34. Pontoons 20 and 21 can be mounted to the front of a barge (not shown), for example, for moving the collection roll forwardly through oil layer 14 as it rotates, as indicated by the arrows in FIGS. 1 and 2. The wringer applies pressure to the longitudinal surface of the collection roll to deform the sponge coating and squeeze out the absorbed oil and water. The removed oil/water mixture 54 fills collection channel 36 and flows downwardly along the channel into collection chamber 32. Doctor blade 40 is preferably used to provide an elongated transverse weir for the oil and water removed from the collection roll. Since the longitudinal surface of wringer 34 is held firmly against collection roll 10, counterclockwise rotation of the collection roll causes the wringer to rotate in a clockwise direction, as shown by the arrows in FIGS. 1 and 2. Alternatively, drive motor 52 can be used to rotate the wringer. In some applications, for example, it may be desirable to rotate the wringer at a higher speed than that of the collection roll. A rotary auger bit (not shown) may be disposed in the collection channel to remove relatively thick accumulations of oil and sludge.

FIG. 4 shows a system for supporting a plurality of oil collection rolls 10. Each roll is supported at its ends by a cooperating pair of floating logs 56. Adjacent pairs of logs are braced by elongated cross-bars 58 secured to the tops of the logs. The cross-bars and logs further cooperate to support collection tanks 60 located below discharge ends 33 of each collection roll. The ends of each cooperating pair of logs are secured together by brackets 62 fastened at their ends to the tops of the logs. The logs float up and down with the tide to keep a relatively constant portion of the collection roll immersed in the oil layer.

FIG. 3 shows a preferred system for recovering the oil/water mixture removed from the collection roll. An end plate 64, preferably part of framework 24, is disposed at the lower end of collection channel 36 to provide a discharge weir for the downward flowing oil/water mixture. A collection receptacle 66 having an open bottom 67 is supported from a nearby barge (not shown), for example, so that a substantial portion of the receptacle is located below the upper level of oil layer 14. The receptacle is used to collect the oil/water mixture squeezed from the collection roll. Preferably, suction means such as a pump 68 is connected between a draw-off pipe 70, which leads away from discharge end 33 of the collection roll, and a delivery pipe 72 extending to the top of receptacle 66. In use the oil/water mixture squeezed from the collection roll is collected by pipe 70 and pumped to receptacle 66 through delivery pipe 72. Since crude oil is immiscible in water and has a specific gravity less than that of water, the oil/water mixture pumped to the receptacle separates so that an increasingly deeper top layer of recovered crude oil 74 accumulates in the receptacle. As a result, water 76 in the bottom of the receptacle is slowly displaced downwardly through opening 67.

A float 78 comprising a circular base member 80 and an elongated stem 82 extending upwardly from the center of base 80 is disposed in the receptacle. The float is constructed of a material, such as hard plastic, having a specific gravity greater than that of oil and less than that of water so that it floats at an interface 84 defined by the bottom oil layer 74 and the top of water layer 76 in the bottom of the receptacle. Circular base 80 is preferably of "wagon wheel" construction and includes a plurality of spokes (not shown) extending radially outwardly from its center. This construction enhances the stability of the float and enables the water from the recovered oil/water mixture to settle from its crude oil counterpart. As oil is delivered to receptacle 66, water is displaced through opening 67 in the bottom of the receptacle. Base 80 of float 78 descends with the vertical descent of oil/water interface 84 as the water is displaced. A transducer 86, which is sensitive to changes in pressure, specific gravity, or displacement, for example, is coupled to the upper part of stem 82. Transducer 86 senses when oil/water interface 84 is near the bottom of the receptacle by its contact with the layer of crude oil 74 in the receptacle. Transducer 86 is connected to a circuit 88 which leads to suction means such as a pump 90. When oil/water interface 84 reaches a preselected level near the bottom of the receptacle, transducer 86 is actuated to close the circuit to pump 90. Oil is then discharged from the receptacle by the pump through a lead line 92 extending from the collection tank to the pump. A delivery line 94 extending away from the pump delivers the oil to a collection tank (not shown) located on a nearby barge (not shown). As the oil is pumped from the receptacle, water flows back into the receptacle through opening 67 to replace the removed oil. As a result, oil/water interface 84, and therefore float 78 rises in the receptacle. A second transducer 96 coupled to the lower part of stem 82 senses when oil/water interface 84 is near the top of the receptacle by its rise above the upper level of oil layer 74. Transducer 96 is connected to a circuit 98 which leads to pump 90. When oil/water interface 84 reaches a preselected level near the top of the receptacle, transducer 96 is actuated to open the circuit to pump 90. Pumping operations are stopped and the next oil collection sequence is begun.

Referring to FIG. 5, an alternative form of an oil skimming device 100 includes an elongated trough-like baffle plate 102 disposed below collection roll 10. The baffle plate includes an elongated lower wall 103 which extends the length of the collection roll. The lower wall 103 is curved concave upwardly in transverse cross-section so as to follow the outer contour of the absorbent foam outer covering 18 of the collection roll. The baffle plate further includes a separate elongated outwardly extending lip 104 integral with each upper edge of the lower wall 103, and a pair of end walls 106 adjacent to the ends of the collection roll.

Baffle plate 102 is secured between the pontoons 20 and is arranged so that the top of the baffle plate is below the upper surface of crude oil layer 14. The baffle plate 102 is preferably arranged so that its lower wall 103 is closely spaced from the outer surface of outer foam covering 18. In some applications, however, best results are obtained when the lower wall 103 almost touches the outer surface of the outer foam covering.

During use of the oil skimming device 100 shown in FIG. 5, oil from crude oil layer 14 is taken in by collection roll 10 as the oil flows over the top of the baffle plate 102. The baffle plate substantially prevents the foam outer covering 18 of the collection roll from coming into contact with the water 12 below oil layer 14. Thus, the collection roll picks up only a limited amount of water as it rotates. Moreover, as oil is taken up by the collection roll, a relatively strong suction created across the baffle plate 102 induces strong currents in the oil layer 14 which continuously draws oil into the baffle plate for contact with the collection roll.

A crude oil layer resulting from blow-outs and the like often contains a substantial amount of thick, heavy oils or sludge. During use of the oil skimming device 100, the thick, heavy oil brought under the collection roll 10 tends to accumulate in the form of a grease-like substance which is smeared onto the outer foam covering 18 as the collection roll is held in contact with these accumulations by the closely spaced lower wall 103 of baffle plate 102. Preferably, the baffle plate is made of plastic so that the accumulations of grease are not absorbed or otherwise picked up the baffle plate, with the result that an increased amount of grease is taken up by the collection roll.

Figure 6:
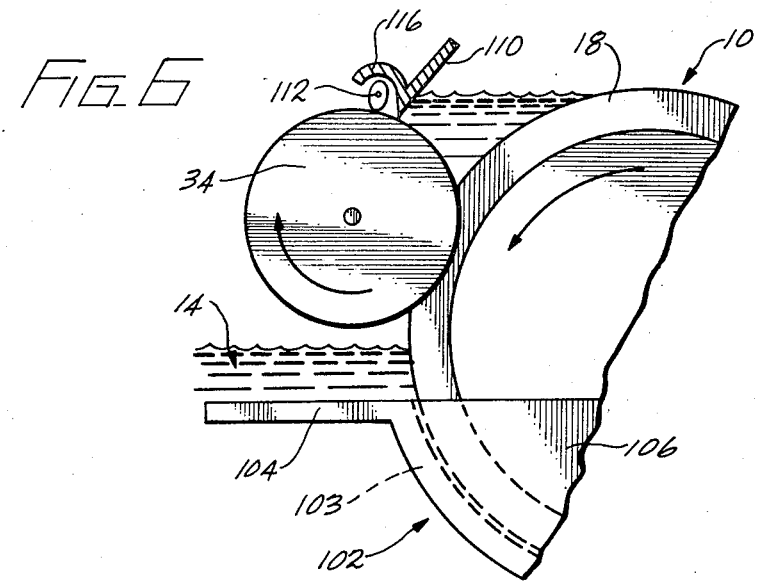
FIG. 6 is a schematic side elevation, partly in section, and partly broken away, showing an alternative form of the screw conveyor means.

FIGS. 5 and 6 show alternative means for removing the oil and grease collected by collection roll 10. The wringer 34 applies pressure to the collection roll outer surface to squeeze out the absorbed oil and water mixture 54, which contains a relatively substantial amount of oil. In the form of the invention shown in FIG. 5, an elongated roller 108, preferably made of hard rubber, is disposed adjacent to the longitudinal upper surface of the wringer 34 askew inwardly toward collection roll 10. In use, the inner side of roller 108 provides an elongated, transverse weir for the oil and water mixture 54 removed from the collection roll to collection chamber 32 (see FIG. 2). The outer side of roller 108 traps grease travelling on wringer 34. In the form of the invention shown in FIG. 6, an elongated scraper blade 110 is substituted for the roller 108, and extends longitudinally along the upper surface of the wringer 34 askew slightly inwardly toward collection roll 10. The inner side of scraper blade 110 provides a weir for the removed oil and water mixture, and the outer side of the blade traps grease travelling on wringer 34.

The grease (not shown) trapped by either roller 108 or scraper blade 110 is removed by a rotary worm gear 112 in a manner akin to the conventional screw conveyor.

In the form of the invention shown in FIG. 5, worm gear 112 is disposed under an arcuately curved cap 114 which cooperates with roller 108 to form an elongated transverse channel for the removal of the grease. In the form of the invention shown in FIG. 6, worm gear 112 is disposed under an arcuately curved cap 116 integral with the outer side of scraper blade 110 for providing an elongated channel for the removal of the grease.

I claim:

1. An apparatus for recovering crude oil floating on a body of water comprising an elongated collection roll having a deformable surface capable of absorbing oil; support means for holding the surface of the collection roll in contact with the oil; means for rotating the collection roll so that the oil is absorbed by the surface of the roll; an elongated discharge roll firmly contacting the longitudinal surface of the collection roll, so that during rotation of the collection roll, the discharge roll deforms the collection roll surface, and squeezes the oil from the collection roll; means for collecting the oil squeezed from the collection roll; and baffle means closely spaced from the lower surface of the collection roll for channeling the crude oil into contact with the surface of the collection roll, the close spacing between the collection roll surface and baffle means providing means to spread thick grease and the like in the crude oil onto the surface of the collection roll.

2. Apparatus according to claim 1 wherein the baffle means includes an elongated trough having an arcuately curved bottom closely spaced from the lower surface of the collection roll, the trough having an upwardly opening end arranged to lie within the layer of crude oil and above the interface between the crude oil and the body of water supporting it, so that the crude oil flows into the open end of the trough during rotation of the collection roll.

3. Apparatus according to claim 1 wherein the grease carried by the collection roll is removed by the discharge roll; and including means held in contact with the discharge roll for trapping the grease travelling on the surface of the discharge roll, and conveyor means for removing the trapped grease.

4. Apparatus according to claim 3 in which the conveyor means comprises an elongated worm gear positioned adjacent to the point of contact between the grease trapping means and the discharge roll.

5. In a system for recovering a substantially water-free layer of crude oil floating on the surface of a body of water, the improvement comprising an elongated collection roll having a porous, deformable, sponge-like surface for absorbing the crude oil; support means for holding the surface of the collection roll in contact with the crude oil layer; means for rotating the collection roll so that the oil is absorbed by the surface of the roll; baffle means closely spaced from the lower surface of the collection roll for channeling the crude oil into contact with the surface of the collection roll, the close spacing between the collection roll surface and the baffle means providing means to spread thick grease and the like in the crude oil onto the surface of the collection roll; an elongated discharge roll firmly contacting the surface of the collection roll, so that during rotation of the collection roll, the discharge roll deforms the collection roll surface, and squeezes the oil from the collection roll; and means for collecting the oil squeezed from the collection roll.

6. The improvement according to claim 5 in which the baffle means includes an elongated trough having an arcuately curved bottom closely spaced from the lower surface of the collection roll, the upper open end of the trough being arranged to lie within the layer of crude oil and above the interface between the crude oil and the body of water supporting it, so that the crude oil flows into the open end of the trough during rotation of the collection roll.

7. The improvement according to claim 5 in which the grease carried by the collection roll is removed by the discharge roll; and including means held in contact with the discharge roll for trapping the grease traveling on the surface of the discharge roll, and conveyor means for removing the trapped grease.

8. The improvement according to claim 7 in which the conveyor means comprises an elongated worm gear positioned adjacent to the point of contact between the grease trapping means and the discharge roll.

9. The method of recovering a substantially water-free layer of crude oil floating on the surface of a body of water, the method comprising contacting the layer of crude oil with an elongated collection roll having a porous, deformable, sponge-like surface capable of absorbing crude oil; rotating the collection roll so that the crude oil is absorbed by the surface of the collection roll; channeling the crude oil into contact with the collection roll by the use of baffle means held in a position closely spaced from the lower surface of the collection roll, whereby the close spacing between the collection roll surface and the baffle means spreads thick grease and the like in the crude oil onto the surface of the collection roll; deforming the collection roll surface during rotation of the collection roll to squeeze the oil absorbed by the collection roll; and collecting the oil squeezed from the collection roll.

10. The method according to claim 9 in which the grease carried by the collection roll is removed by the discharge roll; and including contacting the discharge roll with an elongated knife blade to trap the grease travelling on the surface of the discharge roll.

11. The method according to claim 10 including removing the trapped grease with conveyor means disposed between the collection roll and the discharge roll.

References Cited

UNITED STATES PATENTS

| | | | |
|---|---|---|---|
| 2,117,273 | 5/1938 | Brown | 210—DIG. 21 |
| 3,334,042 | 8/1967 | Telsma | 210—DIG. 21 |
| 1,860,819 | 5/1932 | Schamberger | 210—523 |
| 2,710,071 | 6/1955 | Kinser et al. | 210—103 X |
| 3,426,902 | 2/1969 | Kilpert et al. | 210—179 |
| 3,447,683 | 6/1969 | Luce, Jr. | 210—83 |
| 3,487,927 | 1/1970 | Yahnke | 210—30 |
| 3,219,190 | 11/1965 | Thune | 210—242 |
| 3,546,112 | 12/1970 | Will et al. | 210—30 |
| 3,539,508 | 11/1970 | Bulkley et al. | 210—40 |

FOREIGN PATENTS

| | | | |
|---|---|---|---|
| 219,512 | 2/1962 | Austria | 210—242 |
| 947,026 | 1/1964 | Great Britain | 210—242 |

SAMIH N. ZAHARNA, Primary Examiner

T. A. GRANGER, Assistant Examiner

U.S. Cl. X.R.

210—DIG. 21, 242